US011548142B2

United States Patent
Nose et al.

(10) Patent No.: US 11,548,142 B2
(45) Date of Patent: Jan. 10, 2023

(54) PARALLEL LINK DEVICE

(71) Applicant: Mitsubishi Electric Corporation, Chiyoda-ku (JP)

(72) Inventors: Masaki Nose, Chiyoda-ku (JP); Satoru Sofuku, Chiyoda-ku (JP); Noboru Kawaguchi, Chiyoda-ku (JP); Katsumi Yamazaki, Chiyoda-ku (JP); Shingo Kimura, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 76 days.

(21) Appl. No.: 15/776,426

(22) PCT Filed: Nov. 25, 2015

(86) PCT No.: PCT/JP2015/082999
§ 371 (c)(1),
(2) Date: May 16, 2018

(87) PCT Pub. No.: WO2017/090105
PCT Pub. Date: Jun. 1, 2017

(65) Prior Publication Data
US 2018/0326587 A1    Nov. 15, 2018

(51) Int. Cl.
*B25J 9/00*    (2006.01)
*B25J 17/02*   (2006.01)

(52) U.S. Cl.
CPC ........... *B25J 9/0039* (2013.01); *B25J 9/0042* (2013.01); *B25J 17/0266* (2013.01)

(58) Field of Classification Search
CPC ........ B25J 9/003; B25J 9/0033; B25J 9/0036; B25J 9/0039; B25J 9/0042; B25J 9/0045;
(Continued)

(56) References Cited

U.S. PATENT DOCUMENTS 4,806,068 A * 2/1989 Kohli ........................ B25J 9/04
                                                    414/735
4,819,496 A * 4/1989 Shelef .................. B23Q 1/5462
                                                    74/490.03
(Continued)

FOREIGN PATENT DOCUMENTS

CN    104269097 A  *  1/2015
JP    62-262887 A     11/1987
(Continued)

OTHER PUBLICATIONS

Combined Chilean Office Action and Search Report dated Nov. 30, 2018 in Chilean Patent Application No. 201801344 (with English translation), 17 pages.
(Continued)

*Primary Examiner* — Jonathan Liu
*Assistant Examiner* — Guang H Guan
(74) *Attorney, Agent, or Firm* — Oblon, McClelland, Maier & Neustadt, L.L.P.

(57) ABSTRACT

A parallel link device whose height can be reduced particularly when a movable-side member is brought closer to a fixed-side member, and in which an amount of stroke of the movable-side member can be increased. Specifically, the parallel link device includes a fixed-side member, a movable-side member, six links, and slide mechanisms. Each of the six links has one end connected to the movable-side member with at least two rotational degrees of freedom, and the other end connected to the fixed-side member with at least two rotational degrees of freedom. A connection point of the other end and the fixed-side member is movable with respect to the fixed-side member. Each of the six links has five rotational degrees of freedom and a predetermined length. Each of the slide mechanisms is provided on the
(Continued)

fixed-side member and holds the other end of the link movable within a predetermined range.

20 Claims, 9 Drawing Sheets

(58) Field of Classification Search
CPC ...... B25J 9/0048; B25J 9/0051; B25J 9/0054; B25J 9/0057; B25J 9/006; B25J 9/0063; B25J 9/0066; B25J 9/0069; B25J 17/0266; Y10T 74/20305; Y10T 74/20311; Y10T 74/20317; Y10T 74/20323; Y10T 74/20329; Y10T 74/20335
USPC .............. 74/490.05, 490.01, 490.02, 490.03, 74/490.04, 490.06
See application file for complete search history.

(56) References Cited

U.S. PATENT DOCUMENTS

| | | | | |
|---|---|---|---|---|
| 5,715,729 A * | 2/1998 | Toyama | ............... | B23Q 1/5462 408/234 |
| 5,941,128 A * | 8/1999 | Toyama | ............... | B25J 17/0208 403/53 |
| 6,099,217 A * | 8/2000 | Wiegand | ................ | B23Q 17/22 901/41 |
| 6,240,799 B1 * | 6/2001 | Yau | ...................... | B25J 17/0216 901/22 |
| 6,425,177 B1 * | 7/2002 | Akeel | ................... | B23P 19/105 29/705 |
| 6,543,987 B2 * | 4/2003 | Ehrat | ................... | B25J 15/0616 414/729 |
| 6,840,127 B2 * | 1/2005 | Moran | ................. | B23Q 1/5462 414/735 |
| 7,124,660 B2 * | 10/2006 | Chiang | .................. | A47B 91/16 74/490.05 |
| 8,303,238 B2 * | 11/2012 | Thurneysen | ......... | B23Q 1/5462 901/29 |
| 8,578,811 B2 * | 11/2013 | Alet | ........................ | B25J 9/0042 74/490.09 |
| 9,842,509 B2 * | 12/2017 | Van Lookeren Campagne ........... G09B 9/12 | | |
| D835,171 S * | 12/2018 | Nose | .......................... | B25J 9/04 D16/132 |
| 10,549,433 B2 * | 2/2020 | Nakanishi | .............. | B25J 9/0084 |
| 2004/0144288 A1 | 7/2004 | Chiang | | |
| 2011/0154936 A1 * | 6/2011 | Zhao | ....................... | B25J 9/1065 74/490.04 |
| 2018/0326587 A1 * | 11/2018 | Nose | ........................ | B25J 11/00 |

FOREIGN PATENT DOCUMENTS

| | | | | |
|---|---|---|---|---|
| JP | S63-123881 A | | 5/1988 | |
| JP | 08-090462 A | | 4/1996 | |
| JP | 11-104987 A | | 4/1999 | |
| JP | 2000-502000 A | | 2/2000 | |
| JP | 2003-71665 A | | 3/2003 | |
| JP | 2004-050404 A | | 2/2004 | |
| JP | 2017056496 A | * | 3/2017 | .......... B25J 19/0091 |
| WO | WO 2013/084788 A1 | | 6/2013 | |

OTHER PUBLICATIONS

Japanese Office communication, Notice of Application Number, dated Mar. 7, 2017 in Japanese Patent Application No. 2017-512415 with translation.

Japanese Office communication. Decision to Grant a Patent, drafted Mar. 28, 2018 in Japanese Patent Application No. 2017-512415 with translation.

International Search Report dated Feb. 9, 2016 in PCT/JP2015/082999, filed on Nov. 25, 2015.

* cited by examiner (A)

(B)

PARALLEL LINK DEVICE

TECHNICAL FIELD

The present disclosure relates to parallel link devices, and more particularly to a parallel link device for use in an industrial robot, a device for astronomical purposes and the like.

BACKGROUND ART

An example of conventional parallel link devices for use in handling a heavy object is disclosed in Japanese Patent Laid-Open No. 11-104987. Specifically, a non-extendable arm has one end coupled to a fixed-side member with a slip block interposed therebetween, and the other end coupled to a movable-side member with a bearing portion interposed therebetween. The movable-side member can be moved by moving the slip block in a height direction (Z direction).

CITATION LIST

Patent Document

PTD 1: Japanese Patent Laid-Open No. 11-104987

SUMMARY OF INVENTION

Technical Problem

In Japanese Patent Laid-Open No. 11-104987, moving the movable-side member upward decreases the spacing in the height direction between the movable-side member and the facing fixed-side member, but causes an inclined guide portion to extend upward beyond the fixed-side member. Thus, the extending length of the inclined guide portion protruding in the Z direction is added to the Z direction spacing between the fixed-side member and the movable-side member. Accordingly, the Z direction length of the entire parallel link device including the protruding length of the inclined guide portion, namely, the required space, increases. In this manner, in the case of the device of Japanese Patent Laid-Open No. 11-104987, the space cannot be saved even when the movable-side member moves upward by large amount of movement and the height direction spacing between the movable-side member and the fixed-side member is reduced.

The present disclosure has been made in view of the problem described above, and an object of the present disclosure is to provide a parallel link device whose height can be reduced particularly when a movable-side member is brought closer to a fixed-side member, and in which an amount of stroke of the movable-side member can be increased.

Solution to Problem

A parallel link device of the present disclosure includes a fixed-side member, a movable-side member, six links, and a plurality of slide mechanisms. Each of the six links has one end connected to the movable-side member with at least two rotational degrees of freedom and the other end connected to the fixed-side member with at least two rotational degrees of freedom. A connection point of the other end and the fixed-side member is movable with respect to the fixed-side member. Each of the six links has five rotational degrees of freedom and a predetermined length. Each of the plurality of slide mechanisms is provided on a side face of the fixed-side member and holds the other end of the link movable along the slide mechanism within a predetermined range.

Advantageous Effects of Invention

According to the present disclosure, with the six links and the plurality of slide mechanisms, the height can be reduced particularly when the movable-side member is brought closer to the fixed-side member, and an amount of stroke of the movable-side member can be increased.

DESCRIPTION OF EMBODIMENTS

Embodiments of the present disclosure are described hereinafter with reference to the drawings.

First Embodiment

Referring first to FIGS. 1 to 6, the structure of a parallel link device in the present embodiment is described. For convenience of illustration, an X direction, a Y direction and a Z direction are introduced.

Figure 1:
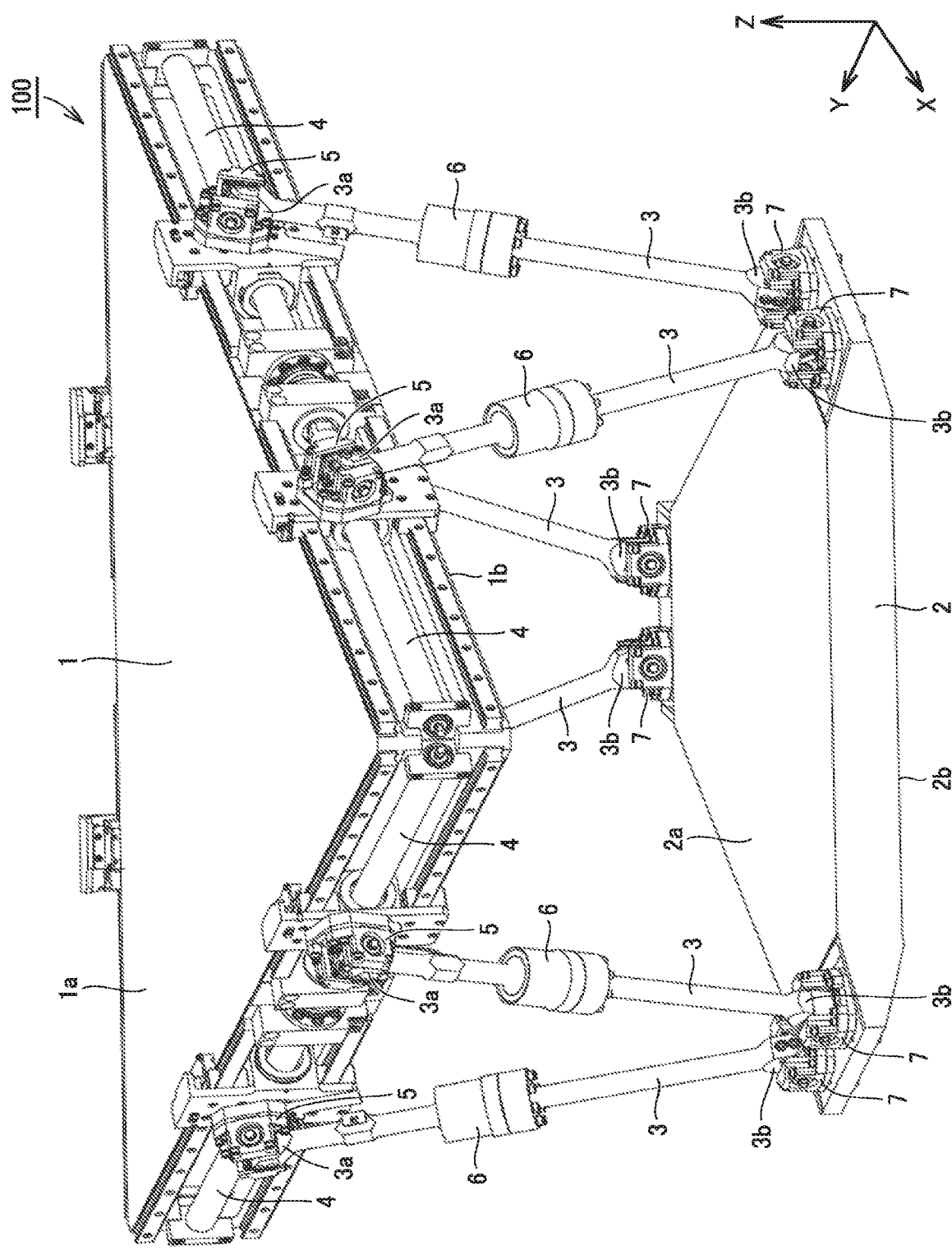
FIG. 1 is a schematic diagram showing an external appearance mode of an entire parallel link device in a first embodiment.
Figure 2:
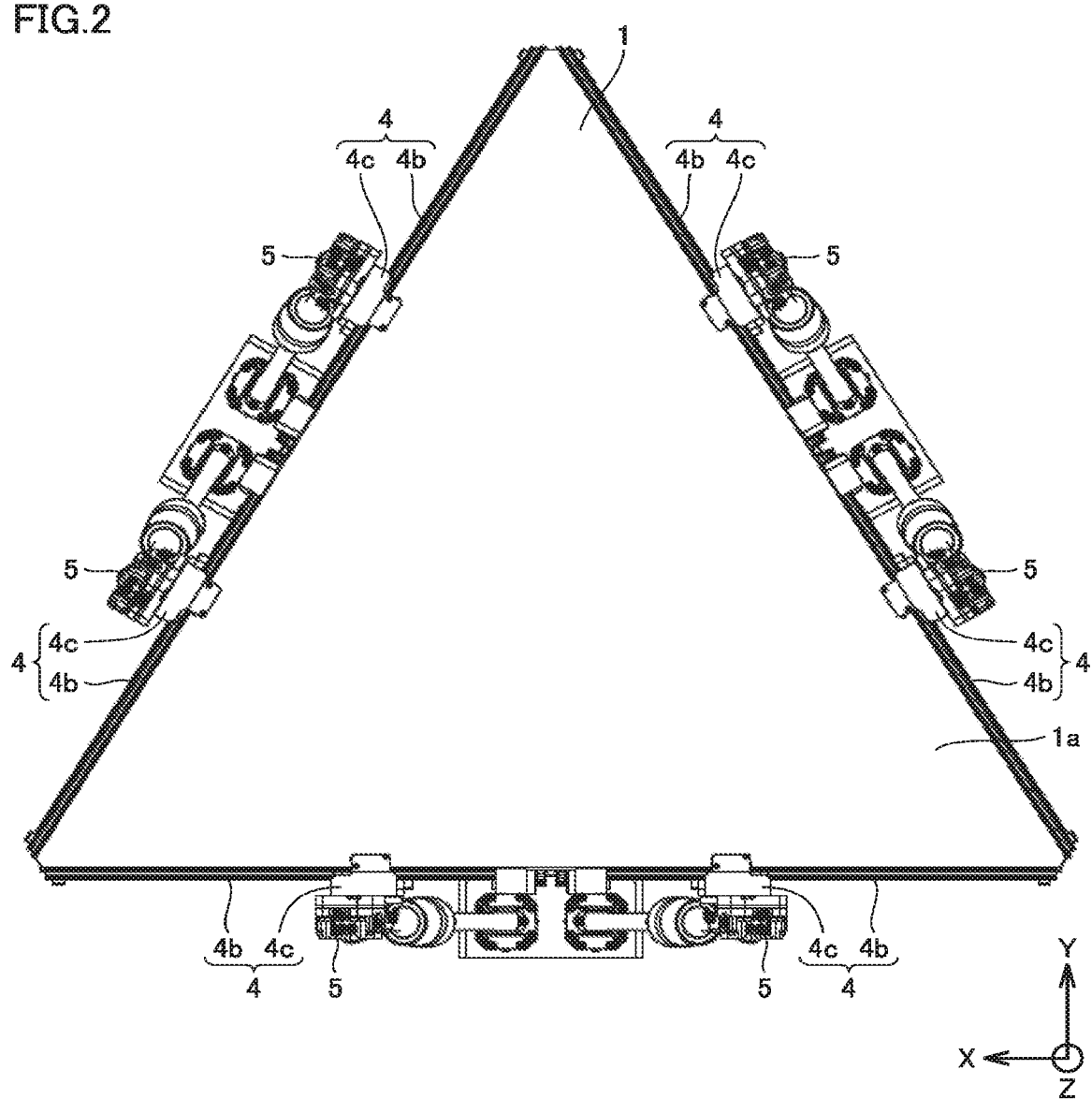
FIG. 2 is a schematic plan view showing a mode of the parallel link device shown in FIG. 1 as seen from above.
Figure 3:
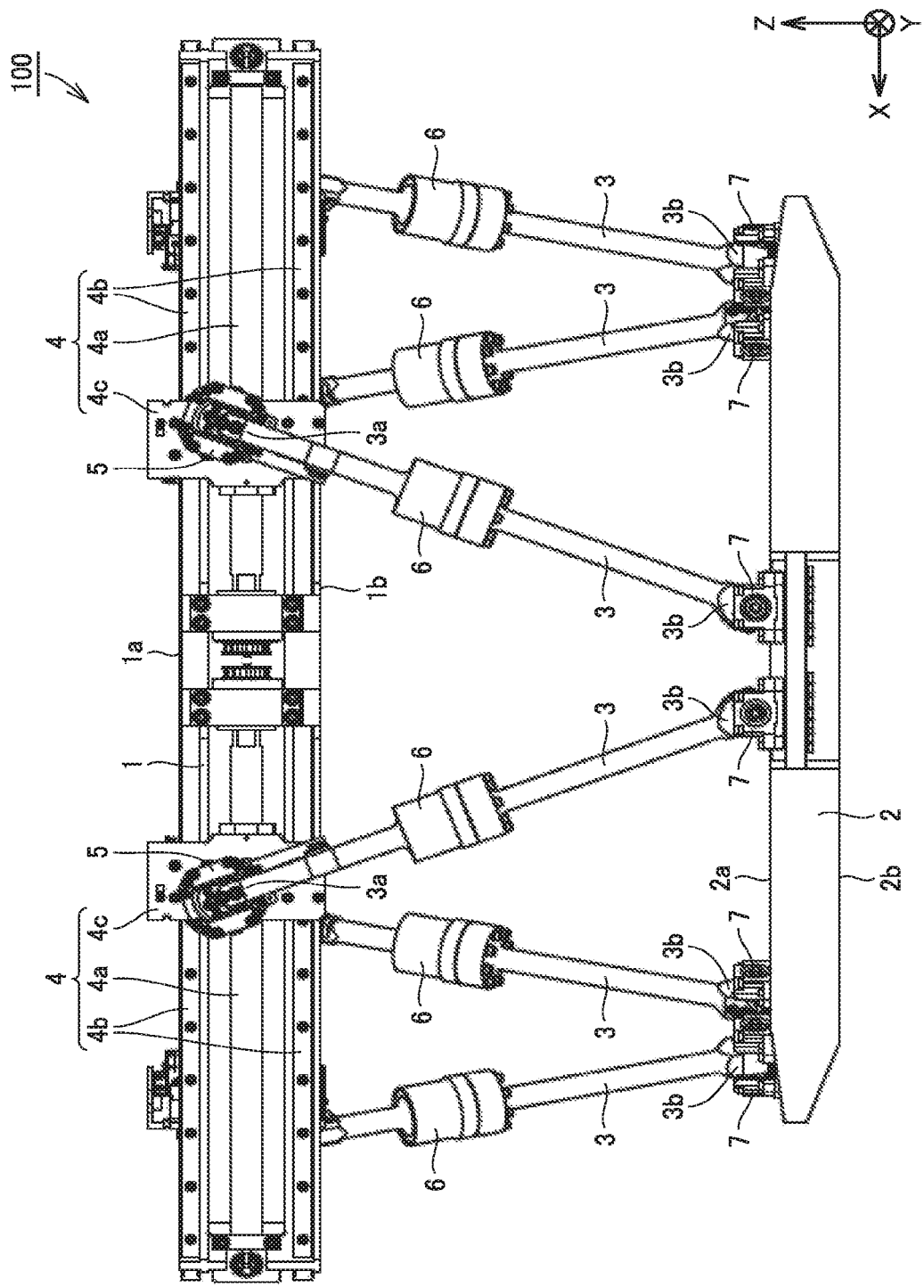
FIG. 3 is a schematic side view showing a mode of the parallel link device shown in FIG. 1 as seen from the front in a Y direction.

FIG. 1 shows an external appearance mode of an entire parallel link device in the present embodiment as seen from slightly above the front. FIG. 2 shows a structure of the parallel link device shown in FIG. 1 in plan view, and FIG. 3 shows by way of example an external appearance mode of the parallel link device shown in FIG. 1 as seen from the front in the Y direction. A parallel link device 100 in the present embodiment is mainly composed of a fixed-side table 1 as a fixed-side member, a movable-side table 2 as a movable-side member, six links 3, and slide mechanisms 4 at a total of six locations.

An upper main surface 1a and an opposed lower main surface 1b of fixed-side table 1 have a polygonal shape in plan view, and particularly have a regular triangular shape here. Main surface 1b may have a triangular shape other than a regular triangular shape, but desirably has a regular triangular shape because six links 3 can be moved in the same way. An upper main surface 2a and an opposed lower main surface 2b of movable-side table 2 also have a planar shape which is substantially a regular triangular shape, and have a hexagonal planar shape to be exact by being linearly chamfered at the corners. Fixed-side table 1 is arranged above movable-side table 2 such that main surface 1b of fixed-side table 1 and main surface 2a of movable-side table 2 face each other having a spacing between them with respect to the Z direction.

Fixed-side table 1 does not move but is fixed at a predetermined position with respect to the Z direction. In contrast, movable-side table 2 moves relative to fixed-side table 1 mainly in the Z direction that intersects an X-Y plane parallel to the main surfaces of fixed-side table 1 and movable-side table 2. Namely, as movable-side table 2 moves upward or downward, the distance between movable-side table 2 and fixed-side table 1 decreases or increases. Movable-side table 2 can also move in the X-Y plane within a range predetermined depending on its position in the Z direction. Movable-side table 2 cannot move in any of the X direction and the Y direction when at its lowest position in the Z direction. As the position in the Z direction moves up from the lowest position, movable-side table 2 is allowed to move in both the X direction and the Y direction. Movable-side table 2 can also be inclined within a range predetermined depending on its position in the Z direction. Ranges in which movable-side table 2 can move in the X direction and the Y direction are at their maxima around the middle in the Z direction, and decrease according as the movable-side table 2 moves upward from the position corresponding to the maximum ranges. Once movable-side table 2 reaches its highest position in the Z direction, it cannot move in any of the X direction and the Y direction. Parallel link device 100 utilizes this movement of movable-side table 2 to position movable-side table 2 with six degrees of freedom to an appropriate position in order to grip an object. And the parallel link device 100 is used for gripping the object, lifting and moving the object, and lowering and releasing the object after the movement, for example.

Although not depicted, movable-side table 2 is provided with a robot hand. The robot hand is a member for gripping an object and holding the object on the lower side of movable-side table 2. The upper side of fixed-side table 1 is provided with a movement mechanism (not shown) for moving the entire mechanism including slide mechanisms 4 and six links 3 which are described later. This entire mechanism is thus movable along a rail or the like provided on a building.

The robot hand attached is shaped to be suitable for the shape of an object to be gripped. When a plate-like object (not shown) is to be gripped, for example, a claw-like robot hand is provided from a side face corresponding to each side forming the triangular shape of movable-side table 2. The lower side of the plate-like object is supported by the robot hand, and the plate-like object is held between the robot hand and movable-side table 2. As a result, the height of the entire mechanism including six links 3 holding the plate-like object can be reduced. The reduced height of the entire mechanism including six links 3 allows the mechanism to pass through a portion with height limitations when moving on a rail or the like within a building, for example.

Link 3 is a member extending like an arm, and has a predetermined length, namely, a fixed length. Link 3 has one end, a link one end 3b, connected to movable-side table 2, and the other end, a link other end 3a, connected to fixed-side table 1. Particularly, link other end 3a is held by slide mechanism 4 provided on fixed-side table 1. Six links 3 connect fixed-side table 1 and movable-side table 2 in this manner.

Slide mechanism 4 is now described. Two slide mechanisms 4 are provided on each of three side faces of fixed-side table 1 existing from main surface 1a to main surface 1b in a thickness direction of fixed-side table 1. Two slide mechanisms 4 are provided at the same height of the side face so as to extend from the center to both sides, and slide mechanisms 4 are provided at a total of six locations on fixed-side table 1.

As shown particularly in FIG. 3, each slide mechanism 4 includes a roller screw 4a, a driving rail 4b as a linear guide mechanism, and a driving block 4c provided with a through hole through which roller screw 4a is inserted and which is provided with recesses formed spirally on its inner surface to be fitted with projections of roller screws 4a. Roller screw 4a rotates by a motor not shown in FIG. 3. When roller screw 4a rotates, driving block 4c moves on a straight line along driving rail 4b. Driving rail 4b is a rail that extends along a longitudinal direction of each of the three side faces of fixed-side table 1, and allows link other end 3a to move along its extending direction. Link other end 3a is held by slide mechanism 4 such that it is movable within a predetermined range. That is, link other end 3a is held such that it is movable by the length of driving rail 4b of slide mechanism 4 along the direction in which that driving rail 4b extends. Namely, link other end 3a is held such that it is movable along the longitudinal direction of each of the three side faces of fixed-side table 1. Two links 3 having two link other ends 3a moving along the same side face of fixed-side table 1 connect to movable-side table 2 at a corner of the regular triangle of main surface 2a of movable-side table 2 such that their two link one ends 3b are close to each other. The positions where six link one ends 3b connect to main surface 2a are arranged such that there are three axes with which two sets of three points are line-symmetrical each other and which is spaced from one another by 120 degrees, and such that the positions are rotationally symmetrical around the center of gravity of main surface 2a.

Driving block 4c is connected to link other end 3a of link 3 with a bearing portion 5 interposed therebetween. Driving block 4c is mounted so as to be engaged with driving rail 4b, thereby allowing link 3 connected to driving block 4c to move along the direction in which driving rail 4b extends. Driving block 4c can be driven with high rigidity and precision on driving rail 4b. In addition, the use of roller screw 4a for the movement of driving block 4c along the direction in which driving rail 4b extends allows for more precise movement. The position where link other end 3a connects may be moved by a mechanism different from roller screw 4a.

Link 3 is composed of an upper portion and a lower portion that are rotatably connected with a bearing portion 6 interposed therebetween. The upper portion is the side including link other end 3a.

Link one end 3b of link 3 is connected to a region on main surface 2a of movable-side table 2, which is near a linearly chamfered corner of the triangular shape in plan view, with a bearing portion 7 interposed therebetween.

Figure 4:
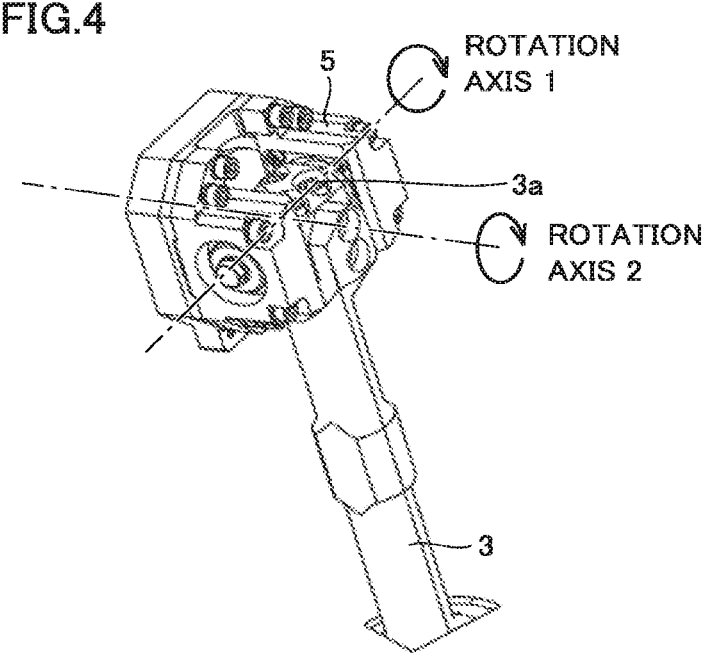
FIG. 4 is a schematic diagram showing an operation mode and a connection mode on the upper side of each link shown in FIG. 1.
Figure 5:
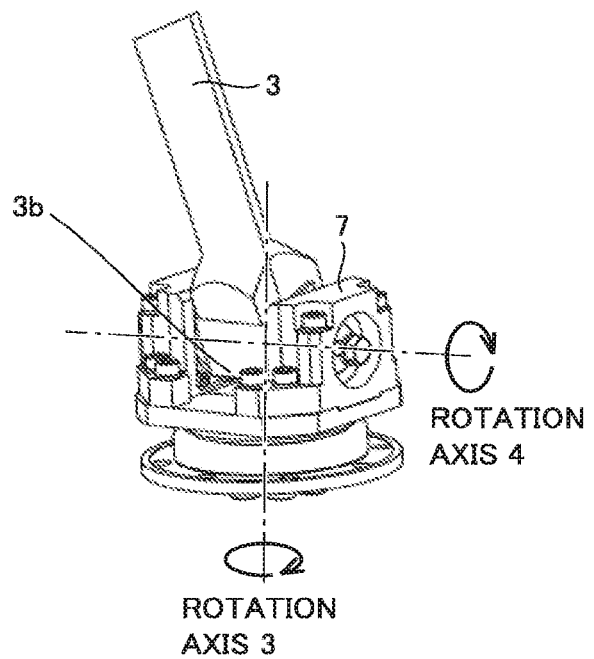
FIG. 5 is a schematic diagram showing an operation mode and a connection mode on the lower side of each link shown in FIG. 1.
Figure 6:
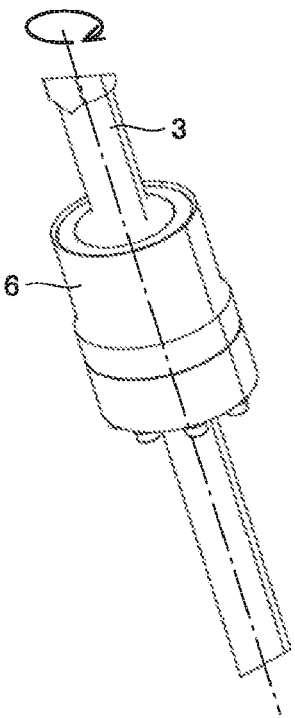
FIG. 6 is a schematic diagram showing an operation mode and a connection mode at a central portion of each link shown in FIG. 1.

Referring now to FIGS. 4 to 6, link 3 and its connection mechanism are described. FIG. 4 particularly shows an upper portion of link 3, FIG. 5 particularly shows a lower portion of link 3, and FIG. 6 particularly shows a central portion of link 3, which are enlarged as compared to FIGS. 1 to 3. As shown in FIG. 4, each of six links 3 is held by slide mechanism 4 on fixed-side table 1 above bearing portion 6 arranged at the central portion of link 3, namely, on the link other end 3a side. Specifically, slide mechanism 4 on fixed-side table 1 and link other end 3a are connected by bearing portion 5 being a connector including a gimbal mechanism.

Bearing portion 5 has a structure that allows link 3 to rotate around a rotation axis 1, as shown in FIG. 4, which passes through a portion where bearing portion 5 is arranged, that is, link other end 3a. Bearing portion 5 also has a structure that allows link 3 to rotate around a rotation axis 2, as shown in FIG. 4, which passes through the portion where bearing portion 5 is arranged, that is, link other end 3a. A direction in which rotation axis 2 extends intersects, for example, orthogonally, a direction in which rotation axis 1 extends. Link other end 3a thus has two rotational degrees of freedom with respect to fixed-side table 1. Since link other end 3a is connected to driving block 4c with bearing portion 5 interposed therebetween as described above, link other end 3a is connected to slide mechanism 4, A connection point of link other end 3a and the fixed-side table 1 is movable along the direction in which slide mechanism 4, that is, driving rail 4b extends.

As shown in FIG. 5, each of six links 3 is connected to movable-side table 2 with bearing portion 7 interposed therebetween below bearing portion 6, that is, on the link one end 3b side. Specifically, movable-side table 2 and link 3, that is, link one end 3b are connected by bearing portion 7 serving as a connector including a gimbal mechanism.

Bearing portion 7 has a structure that allows link 3 to rotate around a rotation axis 3, as shown in FIG. 5, which passes through a portion where bearing portion 7 is arranged, that is, link one end 3b. Bearing portion 7 also has a structure that allows link 3 to rotate around a rotation axis 4, as shown in FIG. 5, which passes through the portion where bearing portion 7 is arranged, that is, link one end 3b. A direction in which rotation axis 4 extends intersects, for example, orthogonally, a direction in which rotation axis 3 extends. Link one end 3b thus has two rotational degrees of freedom with respect to movable-side table 2.

As shown in FIG. 6, the central portion of each of six links 3 is provided with bearing portion 6 that rotatably connects the upper portion of link 3 and the lower portion of link 3. With this bearing portion 6, each of the upper portion of link 3 and the lower portion of link 3 can rotate around a rotation axis 5 passing through a central portion of a cross section intersecting the direction in which link 3 extends and extending along the direction in which link 3 extends. That is, link 3 is connected such that its portion above bearing portion 6 and its portion below bearing portion 6 have one rotational degree of freedom.

With five rotation axis 1 to rotation axis 5 described above, each of six links 3 has a total of five rotational degrees of freedom. Each of six links 3 may have six or more rotational degrees of freedom.

Figure 7:
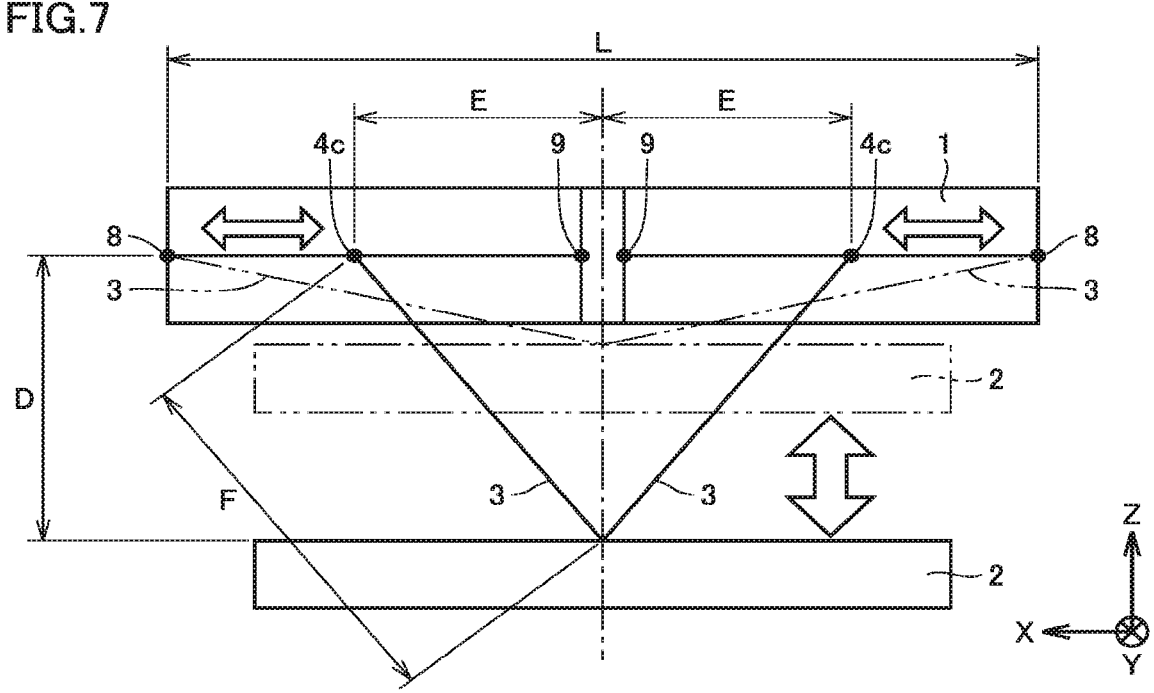
FIG. 7 is a schematic diagram showing the length of each portion of the parallel link device shown in FIG. 1 and a change in mode of the links in each state.
Figure 8:
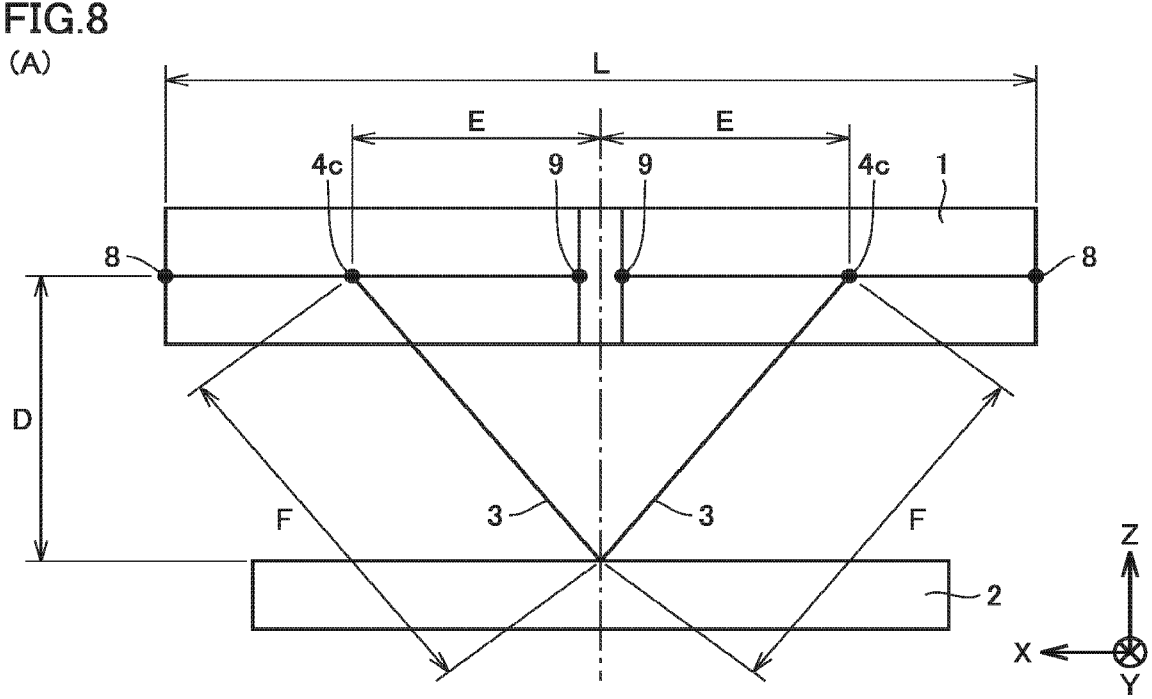
FIG. 8 shows a schematic diagram (A) extracting the mode of the links when a movable-side table moves downward as shown in FIG. 7, and a schematic diagram (B) extracting the mode of the links when the movable-side table moves upward as shown in FIG. 7.
Figure 8:
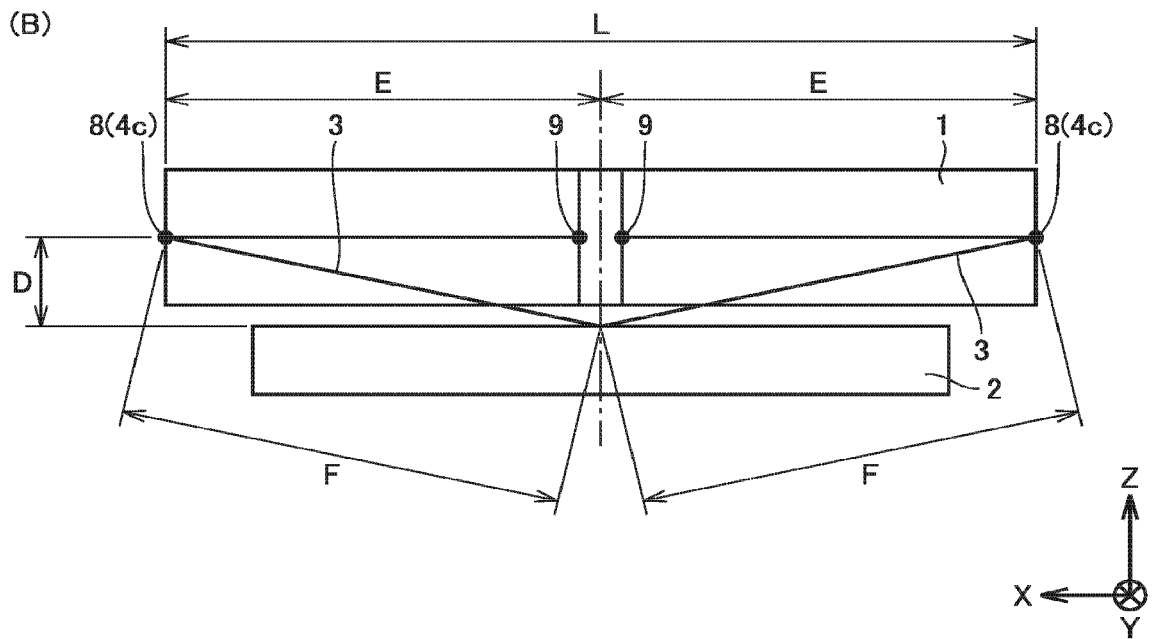
Figure 9:
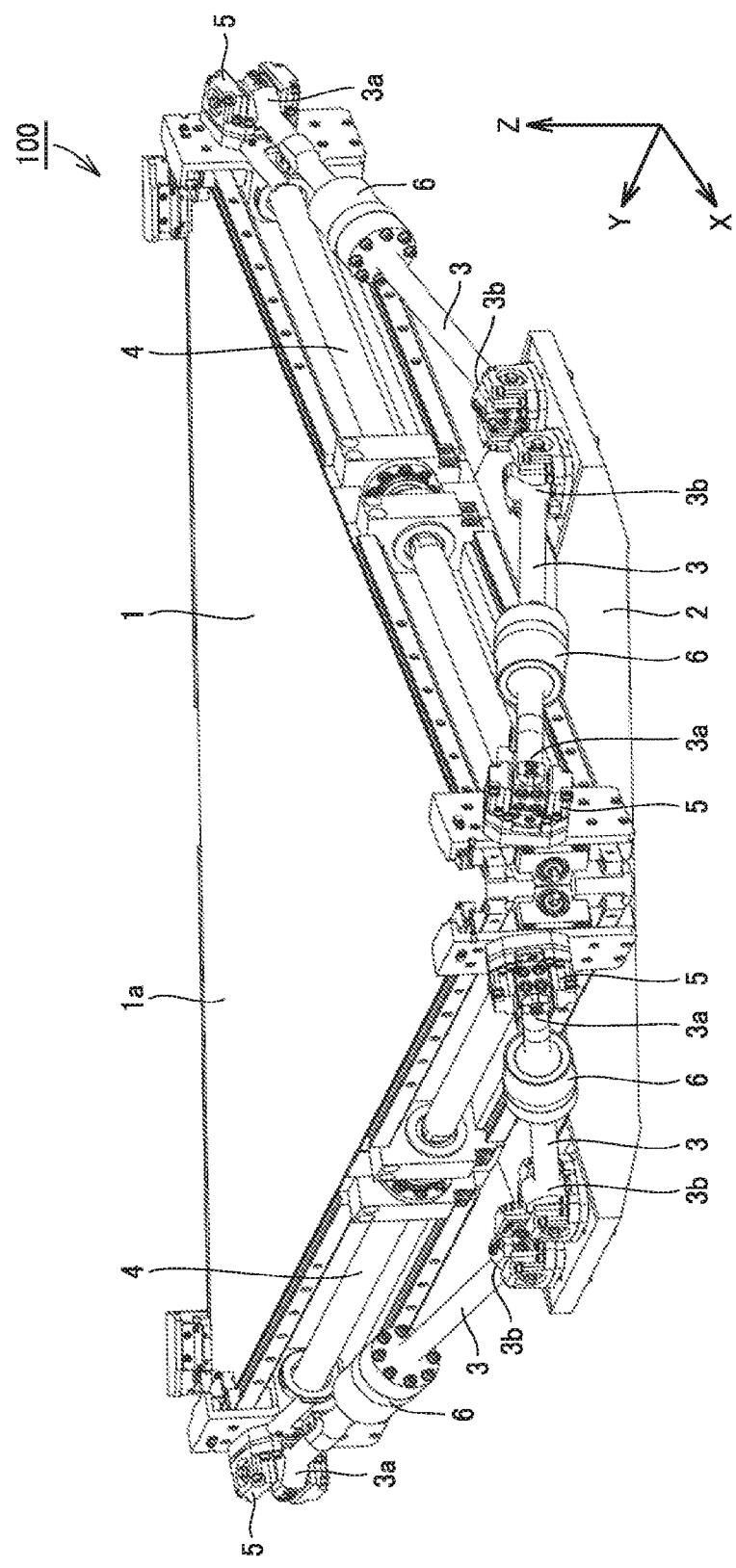
FIG. 9 is a schematic diagram showing an external appearance mode of the parallel link device in the first embodiment when the movable-side table is lifted.

Referring now to FIGS. 7 to 9, operation and the like of a link mechanism during use of parallel link device 100 in the present embodiment is described.

FIG. 7 shows by chain-double-dotted lines movable-side table 2 and link 3 when movable-side table 2 of parallel link device 100 shown in FIG. 1 moves to its highest position, and shows by solid lines movable-side table 2 and link 3 when movable-side table 2 moves downward from the highest position. Link 3 and the like are simplified and indicated as lines in this figure. FIG. 8 (A) shows a mode in which movable-side table 2 moves downward, and FIG. 8 (B) shows a mode in which movable-side table 2 moves upward, respectively. Fixed-side table 1 has a regular triangular planar shape as described above, and therefore actually has three side faces. However, since each face has modes similar to those shown in FIGS. 7 and 8, only one of the faces is shown.

As shown in FIGS. 7 and 8, a virtual center line extending in the Z direction through a central portion in the X direction, for example, of each of fixed-side table 1 and movable-side table 2 in plan view is considered. The structure of entire parallel link device 100 including fixed-side table 1 and movable-side table 2 is symmetrical in the X direction with respect to the center line. A length in the X direction of the side face as each side of the regular triangular shape of fixed-side table 1 is represented by L. In a state where movable-side table 2 is arranged relatively below in the Z direction, a distance in the X direction from the center line to driving block 4c where the other end of link 3, that is, link other end 3a shown in FIG. 3 is connected to fixed-side table 1 is represented by E.

It is assumed that the uppermost portion of link 3 is fixed to the central portion in the Z direction of fixed-side table 1, and driving block 4c is provided at this central portion in the Z direction. A distance in the Z direction between the uppermost portion of link 3 and the uppermost surface of movable-side table 2 is represented by D. A length of each of two links 3 shown in FIG. 7, that is, a length of link 3 including both sides above and below bearing portion 6 is represented by F.

From the state of FIGS. 7 and 8 (A), driving block 4c and the other end of link 3 are moved outward in the X direction, namely, away from the center line, along the direction in which driving rail 4b of slide mechanism 4 (see FIG. 3) extends, and length E is increased. Since link 3 has the predetermined length, movable-side table 2 fixed to the one end of link 3 is pulled by link 3 and moves upward. Then the distance D, as shown in FIG. 8 (B), is decreased.

The chain-double-dotted lines shown in FIG. 7 and FIG. 8 (B) show a state where driving block 4c moves to an outermost driving position 8 which is the outermost position in the X direction, causing length D to be at its minimum and movable-side table 2 to be closest to fixed-side table 1. FIG. 9 shows an external appearance mode of entire parallel link device 100 in which movable-side table 2 moves closest to fixed-side table 1 as shown in FIG. 8 (B).

Although not depicted, when the position of the other end of link 3, namely, driving block 4c moves to an innermost driving position 9 which is the innermost position with respect to the X direction, that is, close to the center line as shown in FIG. 7, length E is at its minimum, movable-side table 2 moves to its lowermost position, and length D is at its maximum. In other words, movable-side table 2 is farthest from fixed-side table 1 at this time.

As described above, by moving driving block 4c and movable-side table 2 as indicated by arrows as shown in FIG. 7, each of the values of length D and length E can be adjusted to any value within a range predetermined by slide mechanism 4. Distance D in the Z direction between fixed-side table 1 and movable-side table 2 is determined by distance E of driving block 4c from the center line and length F of link 3, and can be basically expressed as $D^2=F^2-E^2$. Length D has the maximum value when $E≈0$ holds, which leads to $D≈F$, at which time length D is substantially equal to length F of link 3. On the other hand, by causing length E to have a maximum value, length D has the minimum value, thus allowing movable-side table 2 and fixed-side table 1 to come into nearly contact with each other. Here, relation between length F of link 3 and X direction length L of fixed-side table 1 is set to $F>L/2$.

The function and effect of the present embodiment is described.

The present embodiment has a structure in which link other ends 3a of six links 3 are held by and connected to slide mechanisms 4 extending along the three side faces of fixed-side table 1, and are movable by the linear guide mechanisms of slide mechanisms 4 within the ranges in which slide mechanisms 4 extend. In addition, link one ends 3b of six links 3 are connected to movable-side table 2.

As a result, movable-side table 2 is movable in the Z direction depending on movements of link other ends 3a along the directions in which slide mechanisms 4 extend. By moving movable-side table 2 upward to bring movable-side table 2 closer to fixed-side table 1, for example, the length in the Z direction of entire parallel link device 100 including fixed-side table 1 and movable-side table 2 can be reduced. Parallel link device 100 can be expanded and contracted with respect to the Z direction as shown in FIGS. 7 and 8.

Here, link other ends 3a are connected to fixed-side table 1, and link one ends 3b are connected to movable-side table 2. Thus, during upward movement of movable-side table 2, for example, link one ends 3b does not protrude below movable-side table 2, or link other ends 3a does not protrude above fixed-side table 1. That is, when the Z direction spacing between fixed-side table 1 and movable-side table 2 is reduced, the Z direction length of entire parallel link device 100 can be made more compact.

Meanwhile, by increasing particularly the values of lengths L and E as shown in FIG. 7, an amount of change in length D, namely, a movable amount of movable-side table 2 can be increased. The movable amount is an amount of stroke. The amount of stroke of movable-side table 2 can be increased in this manner. Increasing the amount of stroke of movable-side table 2 as described above is referred to as a lengthened stroke. As a result, a movable amount of an object moved by movable-side table 2 can be increased, thereby further increasing the driving ability of parallel link device 100.

Parallel link device 100 in the present embodiment can provide both the compactness in the Z direction and the lengthened stroke during driving as described above, and is therefore highly practical and space-saving. When both the compactness and the lengthened stroke are attained, spacing D in the Z direction between fixed-side table 1 and movable-side table 2 can be basically expressed as $H<D<F$. Here, H represents a distance from lower main surface 1b of fixed-side table 1 to slide mechanism 4.

In parallel link device 100 in the present embodiment, link other end 3a moves in a direction in which each side of fixed-side table 1 extends, namely, in a direction within the X-Y plane. Thus, when the amounts of movement in the X and Y directions of link other end 3a increases particularly to realize the lengthened stroke, length L as shown in FIG. 7 may be increased. Length L as mentioned herein is the length in the X-Y direction of fixed-side table 1. This does not pose a problem, however, because parallel link device 100 in the present embodiment is intended to make the length in the Z direction more compact. In the present embodiment, slide mechanisms 4 are mounted on the plurality of sides, that is, side faces, of fixed-side table 1, thereby allowing link other ends 3a to move along the longitudinal directions of these side faces. That is, link other ends 3a can be moved by utilizing the original length of fixed-side table 1 without additionally providing a member for moving link other ends 3a.

Since parallel link device 100 has six links 3 connecting fixed-side table 1 and movable-side table 2, movable-side table 2 to which six links 3 are connected can be positioned with a total of six degrees of freedom. However, when links 3 are driven in order to move movable-side table 2 in the Z direction, for example, shafts of links 3 may be twisted and the movement of links 3 is limited. To overcome such twist of the shafts of links 3 and suppress the limitation of movement of links 3 caused by the twist, each of links 3 has five rotational degrees of freedom in the present embodiment. As a result, movable-side table 2 can move with six degrees of freedom, by combination not only of movements in directions along the X, Y and Z directions but also of rotations around the axes extending in the X, Y and Z directions, for example.

To realize the five rotational degrees of freedom of link 3, in the present embodiment, link 3 has link one end 3b and link other end 3a connected to movable-side table 2 and fixed-side table 1, respectively, by the connector including a gimbal mechanism having two rotational degrees of freedom, and is also provided with bearing portion 6 at the central portion in order to have one rotational degree of freedom. As a result, the positioning of movable-side table 2 with six degrees of freedom is possible.

In two links 3 having two link other ends 3a moving on the same side face of fixed-side table 1, their two link one ends 3b may connect to movable-side table 2 in any positional relation. Link one ends 3b of links 3 having link other ends 3a moving on different side faces may also connect to movable-side table 2 in any positional relation. Movable-side table 2 may have any shape as long as six link one ends 3b can be connected thereto and movable-side table 2 has an appropriate thickness. When two link one ends 3b of two links 3 having two link other ends 3a moving on the same side face of fixed-side table 1 are mounted close to each other at a corner of regular triangular main surface 2a of movable-side table 2 as in this first embodiment, the amount of stroke of movable-side table 2 can be made longer, and when moving or inclining movable-side table 2 in the X-Y plane, the differences among movable ranges for different directions in the X-Y plane can be reduced.

In states other than the state where movable-side table 2 is lowered to the lowermost position, the positions in the X and Y directions of movable-side table 2 as well as the inclination of movable-side table 2 with respect to the X-Y plane can be changed. Ranges in which the positions and inclination can be changed are at their maxima around $D=F/2$ as shown in FIG. 7. In order to grip an object to be gripped by movable-side table 2 in an appropriate state, it is preferable to change the positions and inclination of movable-side table 2 when movable-side table 2 grips the object.

Second Embodiment

Figure 10:
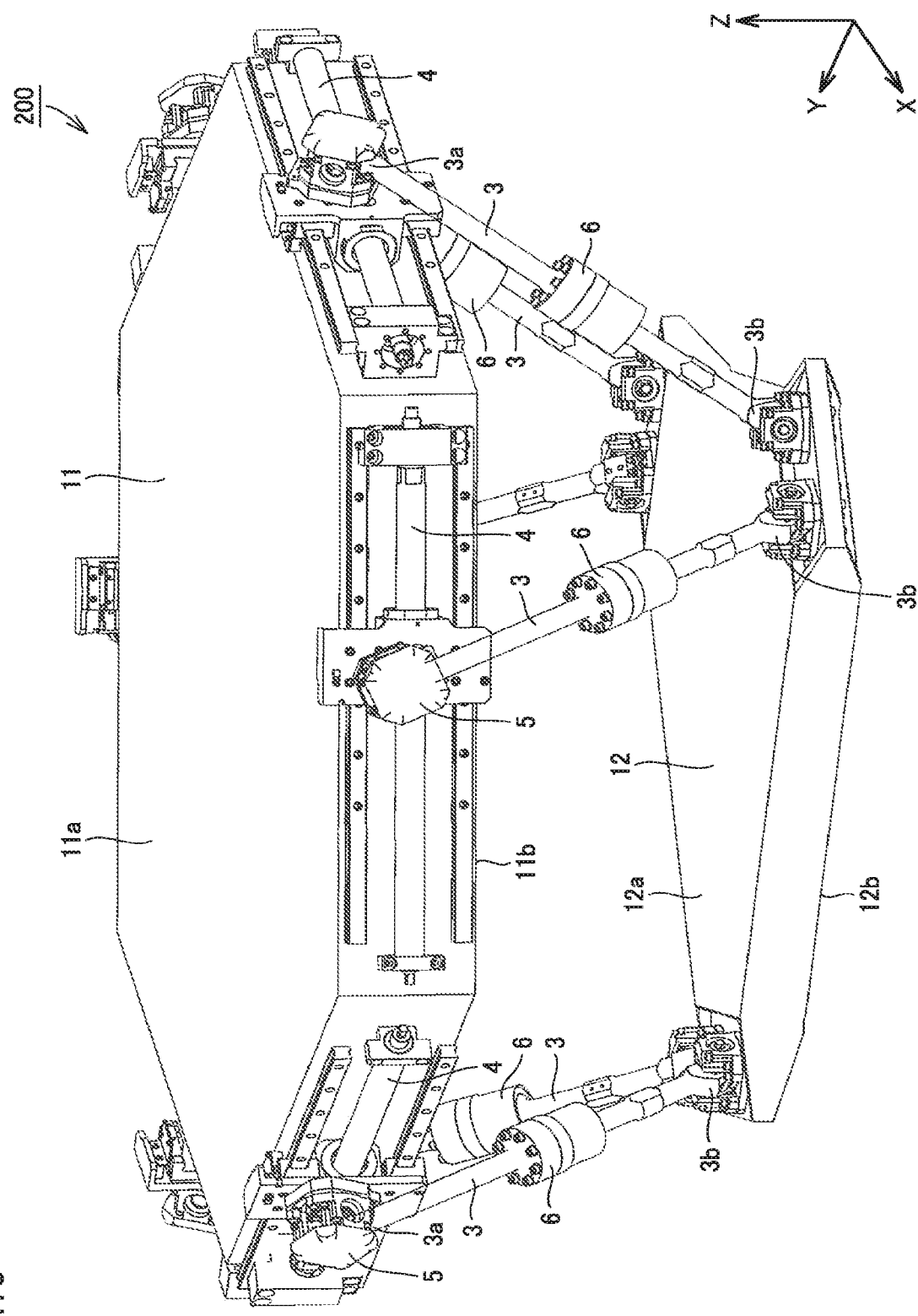
FIG. 10 is a schematic diagram showing an external appearance mode of an entire parallel link device in a second embodiment.

FIG. 10 shows an external appearance mode of an entire parallel link device in the present embodiment as seen from slightly above the front. A parallel link device 200 in the present embodiment basically has a structure similar to that of parallel link device 100 in the first embodiment. Thus, the same components as those of parallel link device 100 are designated by the same reference signs and description thereof is not repeated.

In parallel link device 200, a fixed-side table 11 is different from fixed-side table 1 of the first embodiment in its planar shape. An upper main surface 11a and an opposed lower main surface 11b of fixed-side table 11 have a regular hexagonal shape in plan view. Main surface 11b may have a hexagonal shape other than a regular hexagonal shape, but desirably has a regular hexagonal shape because six links 3 can thereby be moved in the same way. An upper main surface 12a and an opposed lower main surface 12b of a movable-side table 12 have a regular triangular shape as in the first embodiment. A straight line passing through the center of gravity of main surfaces 11a and 11b of fixed-side table 11 and parallel to a Z axis passes through the center of gravity of main surfaces 12a and 12b of movable-side table 12. The vertices of the regular hexagon of main surfaces 11a and 11b of fixed-side table 11 exist on planes each including the Z axis and a straight line from the center of gravity of main surface 12a of movable-side table 12 toward each of the vertices of the regular triangle. One slide mechanism 4 is provided on each of the six side faces of fixed-side table 11. As slide mechanism 4 moves, an angle formed between a segment obtained by projecting link 3 on the X-Y plane and the side face of fixed-side table 11 varies. To prevent contact between link 3 and fixed-side table 11 by this angle variation, link other end 3a is provided at a position farther from the side face of fixed-side table 11 than in the first embodiment.

The fixed-side table of parallel link device 200 may have a triangular shape or a hexagonal shape as long as it is a polygonal shape in plan view. The movable-side table functions equally with any of the shapes, and operates similarly to when it has a triangular shape as shown in FIGS. 7 and 8. Thus, the detailed description of the operation as well as the function and effect is not repeated here.

In the first embodiment, fixed-side table 1 has a regular triangular shape in plan view, and two slide mechanisms 4 are arranged on each of the three side faces of fixed-side table 1. In the second embodiment, fixed-side table 1 has a regular hexagonal shape in plan view, and one slide mechanism 4 is arranged on each of the six side faces of fixed-side table 11. As to the arrangement of the slide mechanisms onto the fixed-side table having a polygonal shape in plan view, the number of slide mechanisms may vary from side face to side face. Slide mechanisms 4 may be arranged in any manner as long as six slide mechanisms 4 can be arranged so that each of slide mechanisms 4 can move link other end 3a within a required range. Slide mechanism 4 may also be arranged on the main surface of fixed-side table 11. An angle between the side face of fixed-side table 11 and lower main surface 11b does not need to be 90 degrees.

When slide mechanisms movable on curves are used, the fixed-side table may have a shape including a curve in plan view. Six links 3 may not have the same length. When the fixed-side table has a shape which is neither a regular triangular shape nor a regular hexagonal shape in plan view, the six links need to have different lengths in order for the movable-side table to be horizontal when lowered to the lowermost position.

Third Embodiment

The present embodiment is different in the structure of the bearing portion connecting link 3 and fixed-side table 1 or movable-side table 2 as is discussed below, and otherwise basically has a structure similar to that of parallel link device 100 in the first embodiment. Thus, the same components as those of parallel link device 100 are designated by the same reference signs and description thereof is not repeated.

Figure 11:
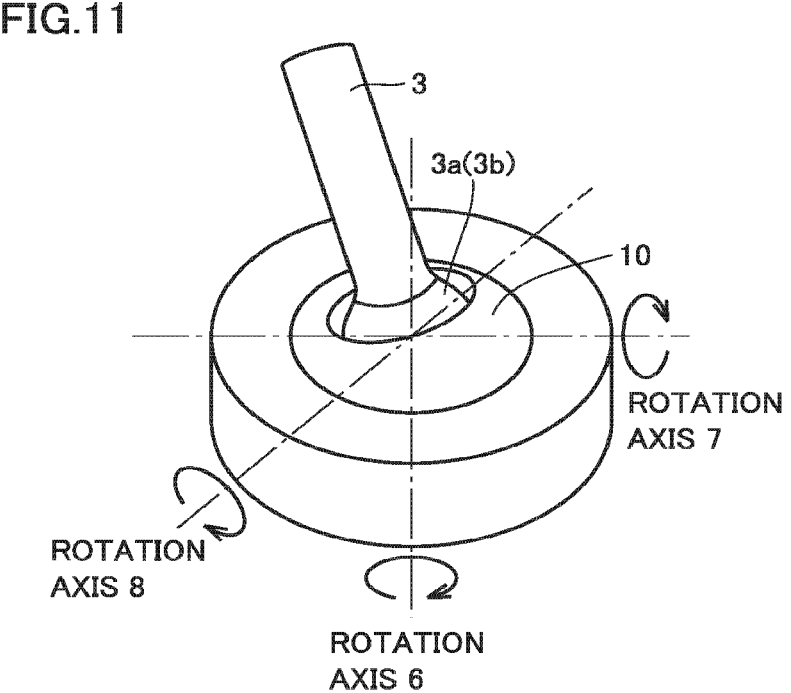
FIG. 11 is a schematic diagram showing an operation mode and a connection mode on the upper side (lower side) of each link in a third embodiment.

FIG. 11 shows link other end 3a on the upper portion of link 3 or link one end 3b on the lower portion of link 3 in the present embodiment, which are enlarged as compared to FIGS. 1 to 3, similarly to FIGS. 4 and 5. In each of six links 3 in the present embodiment, at least one connector including a spherical bearing, that is, a bearing portion 10 is provided to connect, at least either between slide mechanism 4 on fixed-side table 1 (see FIG. 1) and link other end 3a, or between movable-side table 2 and link one end 3b. If either of them are connected by bearing portion 10 as a spherical bearing, the other of them may be connected by bearing portions 5 and 7 each being a connector including a gimbal mechanism as in the first embodiment.

Bearing portion 10 as a spherical bearing allows link 3 to rotate with three degrees of freedom. The three degrees of freedom mean allowing rotation in any direction with respect to a rotation axis 6, a rotation axis 7 and a rotation axis 8 orthogonal to one another shown in FIG. 11.

The function and effect of the present embodiment is described. The present embodiment has the following function and effect in addition to those in the first embodiment.

As described above, one of link other end 3a and link one end 3b connected to bearing portion 10 as a spherical bearing in the present embodiment has three rotational degrees of freedom with respect to fixed-side table 1 or movable-side table 2. As a result, even when the other of link other end 3a and link one end 3b is connected by bearing portions 5 and 7 as a gimbal mechanism in the first embodiment, five rotational degrees of freedom can be attained from a combination of these link other end 3a side and the link one end 3b side. Bearing portion 6 at the central portion in the direction in which link 3 extends can thereby be omitted, thereby reducing the number of components of the bearing portions. The structure of the entire device can thereby be simplified.

As described above, the connections of link one end 3b and link other end 3a to fixed-side table 1 and movable-side table 2 may be made with two rotational degrees of freedom, or may be made with three rotational degrees of freedom.

The features of the components in each embodiment listed above may be combined as appropriate as long as no technical contradictions arise.

It should be understood that the embodiments disclosed herein are illustrative and non-restrictive in every respect. The scope of the present disclosure is defined by the terms of the claims, rather than the description above, and is intended to include any modifications and omissions within the scope and meaning equivalent to the terms of the claims.

REFERENCE SIGNS LIST 1, 11 fixed-side table; 1a, 1b, 2a, 2b, 11a, 11b, 12a, 12b main surface; 2 movable-side table; 3 link; 3a link other end; 3b link one end; 4 slide mechanism; 4a roller screw; 4b driving rail; 4c driving block; 5, 6, 7, 10 bearing portion; 8 outermost driving position; 9 innermost driving position; 100, 200 parallel link device.

The invention claimed is:
1. A parallel link device, comprising:
 a fixed-side member being movable with respect to a building and having two main surfaces and side faces, the side faces existing between the two main surfaces in a thickness direction of the fixed-side member, the fixed-side member having a substantially triangular outer shape in plan view and the parallel link device being configured to be installed in the building;

a movable-side member being arranged below the fixed-side member and being movable with respect to the fixed-side member;

six links, each of the six links having a first end connected to the movable-side member with at least two rotational degrees of freedom, and a second end connected to the fixed-side member with at least two rotational degrees of freedom, a connection point of the second end of each of the six links and the fixed-side member being movable with respect to the fixed-side member, and each of the six links having five rotational degrees of freedom and a predetermined length; and a plurality of slide mechanisms, each slide mechanism of the plurality of slide mechanisms being mounted on a corresponding one of the side faces of the fixed-side member to hold the second end of a corresponding one of the six links movable along the slide mechanism within a predetermined range, the second end of each of the six links being movable along a longitudinal direction of a corresponding one of the side faces of the fixed-side member, wherein when the movable-side member is moved closest to the fixed-side member, spacing between the movable-side member and the fixed-side member is smaller than a thickness of the movable-side member and a thickness of the fixed-side member.

2. The parallel link device according to claim 1, wherein at least one connector including a gimbal mechanism is provided to connect, at least either between each of the plurality of slide mechanisms and the corresponding one of the six links, or between the movable-side member and each of the six links.

3. The parallel link device according to claim 1, wherein at least one connector including a spherical bearing is provided to connect, at least either between each of the plurality of slide mechanisms and the corresponding one of the six links, or between the movable-side member and each of the six links.

4. The parallel link device according to claim 1, wherein each of the plurality of slide mechanisms includes a linear guide mechanism.

5. The parallel link device according to claim 1, wherein each of the plurality of slide mechanisms includes a roller screw.

6. The parallel link device according to claim 1, wherein the first ends of every two links of the six links are connected to corresponding one of three corners of the movable-side member, and a thickness of the movable-side member at the three corners is smaller than a thickness of the movable-side member at a main surface of the movable-side member.

7. The parallel link device according to claim 6, wherein at least one connector including a gimbal mechanism is provided to connect, at least either between each of the plurality of slide mechanisms and the corresponding one of the six links, or between the movable-side member and each of the six links.

8. The parallel link device according to claim 6, wherein at least one connector including a spherical bearing is provided to connect, at least either between each of the plurality of slide mechanisms and the corresponding one of the six links, or between the movable-side member and each of the six links.

9. The parallel link device according to claim 6, wherein each of the plurality of slide mechanisms includes a linear guide mechanism.

10. The parallel link device according to claim 6, wherein each of the plurality of slide mechanisms includes a roller screw.

11. A parallel link device, comprising:
a fixed-side member being movable with respect to a building and having two main surfaces and side faces, the side faces existing between the two main surfaces in a thickness direction of the fixed-side member, the parallel link device being configured to be installed in the building;

a movable-side member being arranged below the fixed-side member and being movable with respect to the fixed-side member;

six links, each of the six links having a first end connected to the movable-side member with at least two rotational degrees of freedom, and a second end connected to the fixed-side member with at least two rotational degrees of freedom, a connection point of the second end of each of the six links and the fixed-side member being movable with respect to the fixed-side member, and each of the six links having five rotational degrees of freedom and a predetermined length; and a plurality of slide mechanisms, each slide mechanism of the plurality of slide mechanisms being provided on a corresponding one of the side faces of the fixed-side member to hold the second end of a corresponding one of the six links movable along the slide mechanism within a predetermined range, the second end of each of the six links being movable along a longitudinal direction of a corresponding one of the side faces of the fixed-side member, wherein the first ends of every two links of the six links are connected to corresponding one of three corners of the movable-side member, a thickness of the movable-side member at the three corners is smaller than a thickness of the movable-side member at a main surface of the movable-side member, and when the movable-side member is moved closest to the fixed-side member, spacing between the movable-side member and the fixed-side member is smaller than a thickness of the movable-side member and a thickness of the fixed-side member.

12. The parallel link device according to claim 11, wherein at least one connector including a gimbal mechanism is provided to connect, at least either between each of the plurality of slide mechanisms and the corresponding one of the six links, or between the movable-side member and each of the six links.

13. The parallel link device according to claim 11, wherein at least one connector including a spherical bearing is provided to connect, at least either between each of the plurality of slide mechanisms and the corresponding one of the six links, or between the movable-side member and each of the six links.

14. The parallel link device according to claim 11, wherein each of the plurality of slide mechanisms includes a linear guide mechanism.

15. The parallel link device according to claim 11, wherein each of the plurality of slide mechanisms includes a roller screw.

16. A parallel link device, comprising:
a fixed-side member being movable with respect to a building and having two main surfaces and side faces, the side faces existing between the two main surfaces in a thickness direction of the fixed-side member, the fixed-side member having a substantially triangular outer shape in plan view, and the parallel link device being configured to be installed in the building;

a movable-side member being arranged below the fixed-side member and being movable with respect to the fixed-side member;

six links, each of the six links having a first end connected to the movable-side member with at least two rotational degrees of freedom, and a second end connected to the fixed-side member with at least two rotational degrees of freedom, a connection point of the second end of each of the six links and the fixed-side member being movable with respect to the fixed-side member, and each of the six links having five rotational degrees of freedom and a predetermined length; and a plurality of slide mechanisms, each slide mechanism of the plurality of slide mechanisms being provided on a corresponding one of the side faces of the fixed-side member to hold the second end of a corresponding one of the six links movable along the slide mechanism within a predetermined range, the second end of each of the six links being movable along a longitudinal direction of a corresponding one of the side faces of the fixed-side member, wherein the first ends of every two links of the six links are connected to a corresponding one of three corners of the movable-side member, and a thickness of the movable-side member at the three corners is smaller than a thickness of the movable-side member at a main surface of the movable-side member.

17. The parallel link device according to claim 16, wherein at least one connector including a gimbal mechanism is provided to connect, at least either between each of the plurality of slide mechanisms and the corresponding one of the six links, or between the movable-side member and each of the six links.

18. The parallel link device according to claim 16, wherein at least one connector including a spherical bearing is provided to connect, at least either between each of the plurality of slide mechanisms and the corresponding one of the six links, or between the movable-side member and each of the six links.

19. The parallel link device according to claim 16, wherein each of the plurality of slide mechanisms includes a linear guide mechanism.

20. The parallel link device according to claim 16, wherein each of the plurality of slide mechanisms includes a roller screw.

* * * * *